No. 629,325. Patented July 25, 1899.
R. ASHLEY.
SECONDARY BATTERY.
(Application filed July 29, 1897.)
(No Model.) 2 Sheets—Sheet 2.
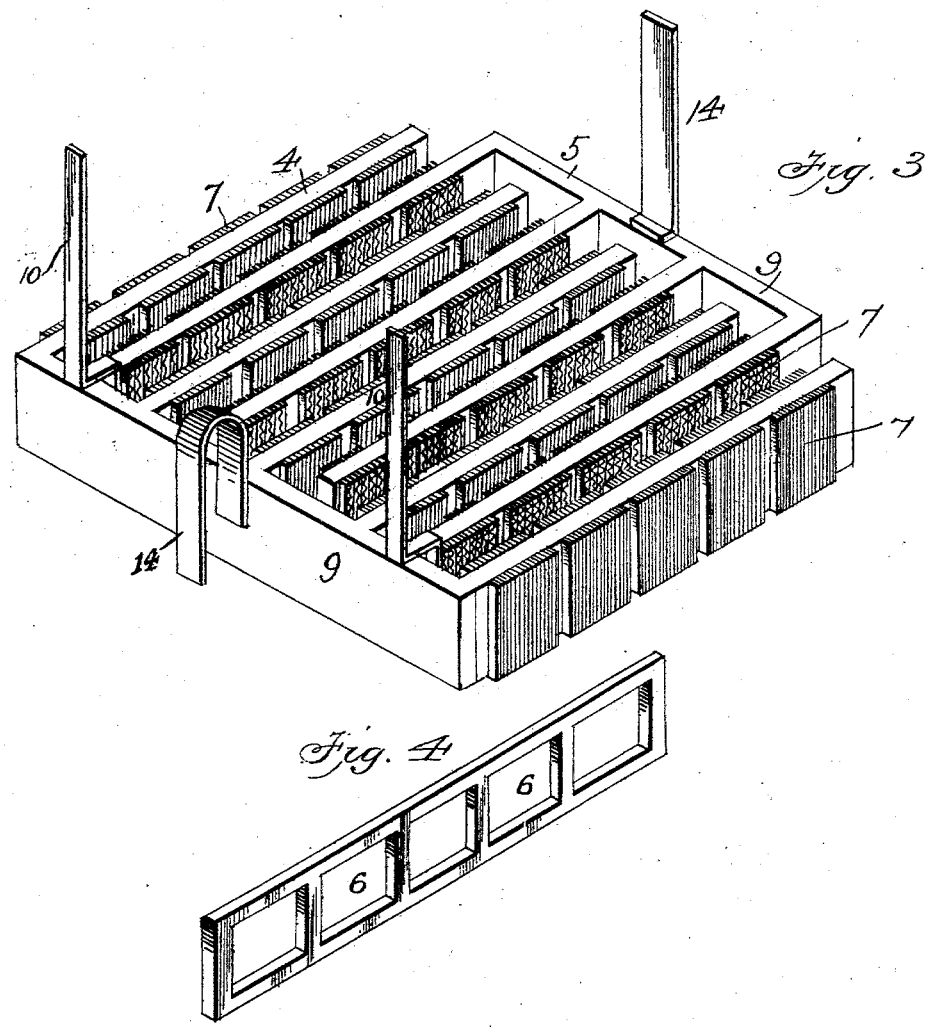

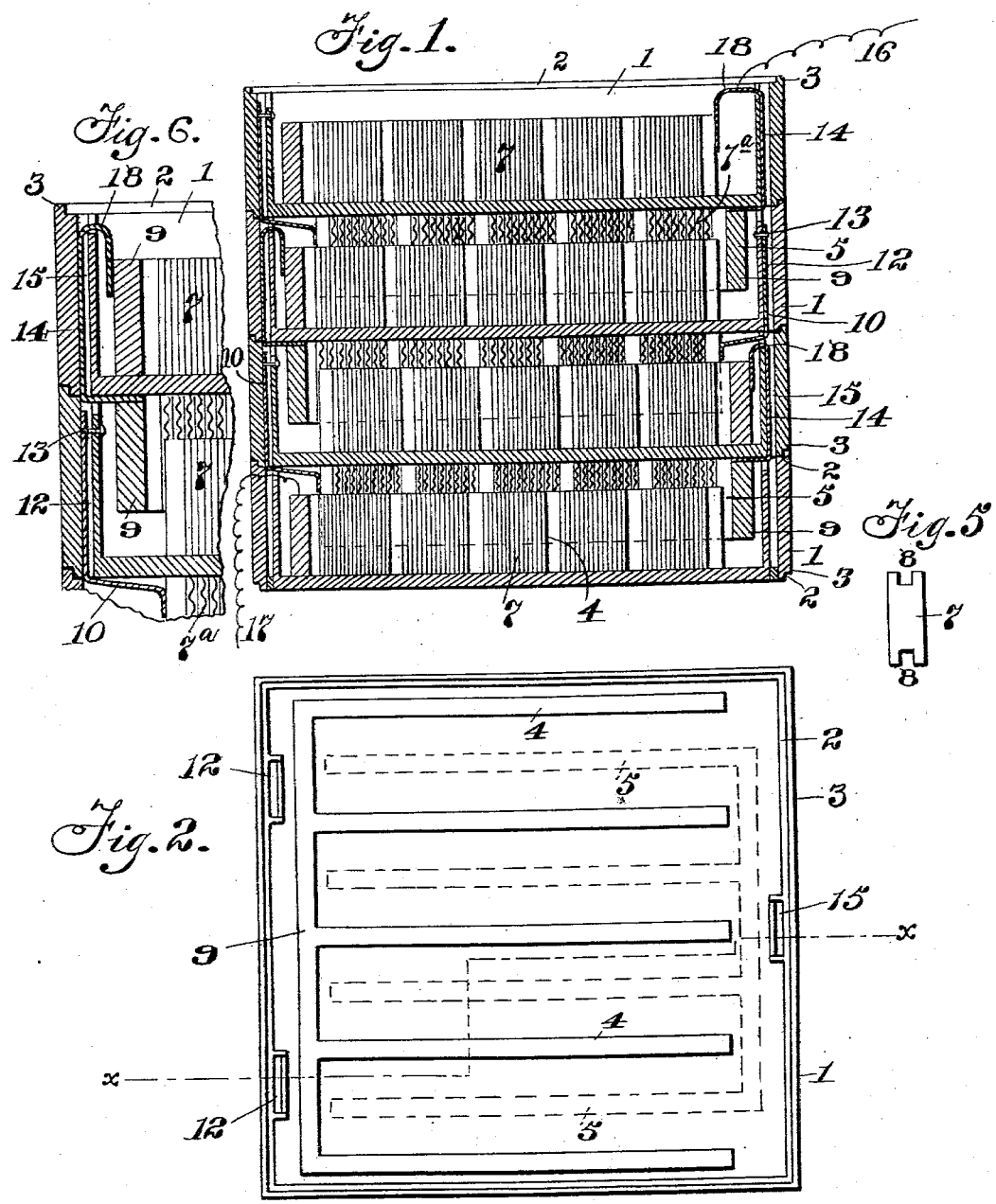

UNITED STATES PATENT OFFICE.

RALPH ASHLEY, OF PORT REPUBLIC, NEW JERSEY, ASSIGNOR, BY MESNE ASSIGNMENTS, TO THE ELECTRIC POWER DEVELOPMENT COMPANY.

SECONDARY BATTERY.

SPECIFICATION forming part of Letters Patent No. 629,325, dated July 25, 1899.

Application filed July 29, 1897. Serial No. 646,371. (No model.)

*To all whom it may concern:*

Be it known that I, RALPH ASHLEY, a citizen of the United States, and a resident of Port Republic, in the county of Atlantic and State of New Jersey, have invented certain new and useful Improvements in Secondary Batteries; and I do hereby declare that the following is a full, clear, and exact description of the invention, which will enable others skilled in the art to which it appertains to make and use the same, reference being had to the accompanying drawings, which form a part of this specification.

My invention relates to storage batteries, it pertaining to improvements in the cups or trays respectively constituting parts of the cells and also to improvements in the construction and arrangement of the electrodes which are combined in such cells.

Figure 1 is a longitudinal vertical sectional view of a storage battery embodying my improvement. Fig. 2 is a plan view showing parts thereof. Fig. 3 is a perspective of a pair or couple of electrodes detached. Fig. 4 is a perspective of one of the frame pieces or supports for the active material. Fig. 5 is an elevation of one of the active plates. Fig. 6 shows parts of Fig. 1 on a larger scale.

In the drawings the numeral 1 indicates one of the cells or trays. Each of these is rectangular in form and is composed of hard rubber or other suitable insulating material with end walls, side walls, and a bottom, all integral. Along the exterior corners of the bottom and the top there are grooves, as at 2, forming shoulders 3, which permit the cells to be fitted one on top of another and hold them properly in place.

The cells herein presented differ from those presented in my earlier patents, No. 591,265, of October 5, 1897, and No. 594,313, of November 23, 1897, in some respects, including this—namely, that in the present case the side walls of the cells are vertical and the bottom of one cell rests upon the top of that below, whereas in my earlier construction the side walls of each cell were flared outwardly and upwardly. In large and heavy batteries the flaring form possesses marked advantages because of the possibility of bringing the metallic and heavier parts of one cell into close juxtaposition with those of the adjacent one, one cell-bottom resting directly upon the next; but there are occasions where substantially tight vertically continuous side walls are desirable, and for such a cell or cup of the character of that herein is intended; but it then becomes necessary to provide another means for permitting the gases to escape and for supporting the electric conductors which extend from one cell to the next, and provisions for these matters are herein made, as will be described below.

The numeral 4 indicates the positive electrode, and 5 the negative. Each electrode comprises an end bar 9 and a series of arm-like or finger-like bars or frame-pieces extending laterally from the end bar, together with masses of active material supported therein. Each arm-like frame has one or more openings 6. In each opening there are loosely packed a number of metal plates 7, formed from lead tape or strips and roughened by passing them between emery-wheels or the like to form a very large number of minute indentations therein, and then subjected to the action of nitric acid to "form" them or render them active. Each plate is formed with a notch 8 at each end, in which notches lie the bars of the supporting-frame. The plates are closely and yet, as above stated, loosely packed in their retaining-openings and placed with the faces of each directly contacting with the faces of those adjacent, so that there is a great extending of the total active surface. When each set or mass of the plates is initially introduced into its opening 6, a space is left at the end of the opening; but as soon as the electrode is "formed" by electrolytic action the series of plates are forced by their expansion so as to occupy the entire space.

The frame-bars are relatively narrow and thin, but solid and strong, while the plates of active material are relatively considerably wider—that is to say, there is a reduction to the minimum of the solid and less permeable metal and, on the contrary, an increase in the maximum of the lighter thinner active material.

It must be noticed that there is here an essential difference when comparison is made with earlier devices having lead-tape strips. In the earlier cases such strips were either rigidly fastened in place or were used merely as the retaining devices for the granular or reduced peroxid of lead or other material with similar consistency and purpose. Here the tape itself constitutes the entire active mass, the indented or roughened surfaces of the tape strips being placed in contact each with those adjacent and not having the spaces between them filled with lead peroxid or other material. The indenting or roughening of the surfaces is to not only assist the strips or plates in being active, but also to assist the electrolytic liquid to freely circulate between them and get access to each and every part thereof, an effect to be at once contradistinguished from that reached in those constructions in which peroxid of lead is tightly packed in the intervening spaces and which prevents such free circulation, and I believe myself to be the first to have devised an electrode in which use is made of a frame of solid relatively rigid metal reduced to the minimum in mass in connection with several sets or masses of lead-tape strips, those of each set or mass being in direct contact face to face when immersed in the electrolytic liquid, but held loosely in the frame, whereby there is provision for expansion in permitting each piece to be moved bodily at its ends and the strips being indented or roughened on their surfaces to increase the area of activity and to permit free circulation of liquid between them; but inasmuch as there are several features of novelty incident to the electrodes and the cells and to their relative arrangement I do not wish to be understood as limiting the improvements in electrodes to this matter alone of having the active lead tape or coil strips all parallel and contacting from end to end with each other, as many of the said features of improvement can be retained, even though some of the strips be corrugated or undulatory in form, as shown in Fig. 6 at 7ª and also in Figs. 1 and 3. Here also we have the same relation between the strips and the retaining-frame that is illustrated at 7 in the drawings.

I now call attention to another important matter incident to the present battery. In all the batteries with non-conducting cell-cups within my knowledge that have heretofore gone into use the electrode-plates have been very wide on vertical lines, and the cups themselves have been correspondingly deep, and an increase in the depth of the cups and the plates has been generally resorted to when it was desired to enlarge the power or efficiency of such a cell; but I have discovered that one of the principal difficulties incident to the ordinary storage batteries and one of the chief reasons why it is necessary to have a large mass of material of great weight in order to reach necessary efficiency is that the specific gravity of the bath or electrolytic mass varies to a marked extent at different points vertically. The efficiency of a given stratum—say one an inch deep—near the bottom of an ordinary cell varies perceptibly from that of a similar stratum near the top, and I have found that uniform action cannot be obtained where the cell and the contained mass of electrolyte are relatively deep and the plates are vertically wide; but I have found that when the electrodes are constructed and arranged upon the principle herein presented I secure substantially uniform action throughout. I employ a shallow mass of electrolyte, throughout which there is practically no variation in the specific gravity. The arms or fingers of each electrode are not of the nature of wide plates, but are relatively narrow, although capable of indefinite elongation as circumstances require, and adapted to be submerged in a shallow electrolyte, as aforesaid. Then to provide a sufficient mass or volume of active material or electrolyte for the entire battery I place one cell upon another, bringing their bottoms relatively close together. Thus, considering the active parts of the battery as an entirety, I have not a vertically-deep unitary mass, as is common, but a large number of shallow masses placed close together and each capable of being made equal to the others in active efficiency. In order that the electrodes may permit the bottoms of the cells to be thus brought close together, I arrange a positive and a negative, so that the arms or fingers of the one shall alternate with those of the other, a negative arm lying between two adjacent positive arms, and vice versa, except that I prefer to have a positive arm on the outside at each end of the series. The end bar 9 of the positive electrode lies along one side of the bottom of the cell and the end bar of the negative electrode lies along the opposite side, the inner ends of the positive arms being disconnected, as are also those of the negative. The negative electrode of each cell above the lowermost one is secured to the under side of its bottom, and the several parts are so related that all of the negative electrode-arms lie more or less in the same horizontal planes with the arms of a positive electrode, this permitting each upper cell to be brought to relatively low lines. In this respect also the present construction is an improvement upon those shown in my earlier patents, Nos. 594,313 and 591,365. I then arrange one electrode in horizontal lines entirely above those of the other, but have now devised means for having the two electrodes lie substantially in the same horizontal planes, and I am now able to obtain from fifty to one hundred per cent. more efficiency from a battery having the same dimensions vertically and laterally. Each negative electrode is fastened at one end to the under side of a cell-bottom by means of the conductor-strip 14, which passes up from the end bar 9 on the under side of the cell through the bottom and into the interior and is secured to the positive electrode upon the upper side of said bottom and at the other end is fastened by means of supporting-strips 10 10, of any suitable number, secured to the ends of its arms and extending upward through the cell-bottom and secured to the vertical side wall of the cell by pins 13. The several arms of the negative electrode are held to the tray-bottom on such transverse lines that when it is put in position upon a tray or cell below these arms will drop down into position between the arms of the positive electrode for the purpose above described. At 12 12 there are channels or ducts of any suitable number along one of the vertical walls of the cell, and at 15 one or more similar ducts are formed along the opposite wall. These channels are closed, except at their upper ends, against communication with the interior chamber of the cell. Their lower ends open at the under side of the cell-bottom. They are of such length vertically that their upper ends lie at or above the top surface of the electrolyte material. Each channel 15 receives one of the conductors 14 and each of the channels 12 receives one of the supporting-strips 10, and in both cases the walls of the channels surround the conductors or metal strips and normally prevent contact of the liquid with the latter. Two plans have been heretofore followed in arranging the conductors in such cells. In one case an aperture is formed in the bottom of the tray and into said aperture was inserted a metallic conductor, its ends projecting, respectively, up and down from the bottom and being immersed in the electrolyte. The other plan is that shown in my Patent No. 591,265, in which case the conductor is carried up on the outside of the wall of the tray and then down on the inside. Of these two plans the first is objectionable in that the conductor through the tray-bottom being constantly in contact with the electrolyte is subject to corrosion and in a short time leakage occurs through the bottom of the cell, and the other plan is sometimes objectionable—as, for instance, where it is desired to avoid having any of the operative metallic parts of the battery exposed at the sides. In the present construction the metallic conductors are normally kept out of contact with the electrolyte and corrosion and deterioration are prevented, and at the same time there is protection against exposure of the metallic parts upon the outside of the battery.

In some extraordinary cases the "boiling" action in the cell may be so violent as to cause an overflow of the liquid, and at such times the surplus or overflow liquid can escape through the channels 12 and 15 and be caught in the cell below. Again, as the metal strips fit loosely in the channels there is sufficient passage-way through the latter to allow the gases that are evolved to readily escape upward to the top of the battery, and thus perforations through the cell-walls are unnecessary, and the outside surfaces of the latter can be continuous, smooth, and tight.

The manner of putting together the parts of the battery will be readily understood and also its mode of operation. The electrodes being properly secured in the way described and each cell having received its quantum of electrolyte the cells are superimposed one upon another. The cells are so placed as to have the negative electrodes of alternate cells extend in opposite directions—that is to say, so that if the end bar 9 of the negative electrode of the lower cell is turned toward the right that of the cell next above would be turned toward the left, and so on throughout the series—and of course there will be a corresponding opposite arrangement of the positive electrodes.

In the most of the figures in the drawings and in the above description I have presented an electrode having a narrow arm for supporting the active material, such as shown in Fig. 4, said arm having but one horizontal series of openings 6; but so far as concerns that part of the invention which relates to having the strips of lead plate or tape packed together in masses, each mass in one of the openings, it will be seen that the frame can be wider without departing from the essential features of this part of the device.

What I claim is—

1. In a storage battery the combination with the series of cells, superimposed upon one another forming a stack or pile, and said cells at one end or side formed with a vertical channel, of the positive and negative electrodes located in said cells, and the conductors secured to said electrodes and passing up through said channels and electrically connecting the negative electrode of one cell with the positive electrode in the cell above, substantially as described.

2. In a storage battery the combination with the series of cells superimposed upon each other so as to form a stack or pile, and formed with a vertical channel in one end, of the positive and negative electrodes located in said cells, the negative electrode secured to the bottom of the cell above and the conductors connecting the negative electrode of one cell with the positive one on the cell above, throughout the series, substantially as described.

3. In a storage battery, the combination with the superimposed cells, having vertical channels in opposite ends or sides, of the positive electrodes located in said cells and supported on the bottom thereof, the negative electrodes also located in said cells, the strip or strips connected therewith and passing up through the channel or channels in one end of the cell above, the pin securing them in place, and the conducting-strip connected with the negative electrodes and passing up through the channel in the other end of said cell above and connected with the positive electrode in said cell, substantially as described.

4. In a storage battery, the combination with the series of superimposed cells, each having a channel in one end or side wall, of the positive and negative electrodes, consisting of the alternately-arranged frames, those of each electrode connected together at one end and the conductors passing up through said channels, substantially as described.

5. In a storage battery, the combination with the series of superimposed cells, each having a vertical channel in one end or side wall, of the positive and negative electrodes consisting of the alternately-arranged parallel open frames connected together at opposite ends, the metal plates packed in the channel or channels of said frame, and the conductors passing up through the channels in said cells, substantially as described.

6. In a storage battery, the combination with the series of superimposed cells, having channels in the side or end walls, of the positive electrodes consisting of the parallel frames connected together at one end, the negative electrodes consisting of the parallel frames located between the frames of the positive electrodes and connected together at the opposite ends, the supporting-strips connected with the negative electrodes and passing up through the channel in one end of said cells and the conductor passing up through the channel at the opposite end, substantially as described.

7. An electrode for a storage battery consisting of a rectangular frame formed with a number of rectangular openings, and the removable metallic plates inserted in said openings having notches in their ends engaging with the edges of said openings, substantially as set forth.

8. An electrode for a storage battery consisting of a number of rectangular, parallel, conducting-frames connected together at one end and formed with a number of rectangular openings, and the bundles of superposed oxidizable metallic plates located in said openings, and the plates of one opening being arranged at right angles to those of the adjoining openings, substantially as set forth.

9. An electrode for a storage battery having a supporting-frame of relatively thin, solid metal arranged to provide bars surrounding one or more open spaces, and, in each of said open spaces, a mass of active material formed of a series of thin lead strips wider than the said bars, and loosely engaging therewith at their ends, whereby the strips of said mass can move bodily under expansion, and said strips being arranged to contact face to face from end to end, and being indented upon their faces and arranged to permit the electrolyte fluid to circulate between and come into free contact with the said indented faces, substantially as set forth.

10. An electrode for a storage battery, consisting of a series of masses of active material, each mass comprising a series of parallel strips of lead tape, the strips in one mass extending at right angles to the strips in the next adjacent masses, and a frame or holder supporting all of said masses, substantially as set forth.

11. The herein-described battery-electrode, consisting of a frame having a series of holders formed therein, and a series of strips of lead tape arranged within each of said holders, the strips in each holder extending in a direction different from that of the strips in any of the adjacent holders, substantially as set forth.

12. The herein-described electrode, consisting of an inclosing frame, having its interior divided by a series of cross-bars into a series of holders, and a series of strips of lead tape arranged within each of said holders, and engaging with the bars forming the same, the strips in one holder extending in a direction different from the strips in adjacent holders, substantially as set forth.

13. In a storage battery a series of two or more superimposed hard-rubber or non-conducting cells, each having upward-extending side walls, and a horizontal bottom, in combination with electrodes arranged in couples, the electrodes of each couple lying in the same horizontal planes, and situated between the bottom of one cell and the bottom of the cell below, and the negative electrode of said couple being rigidly secured to the bottom of the upper cell, substantially as set forth.

In testimony that I claim the foregoing as my own I have hereunto affixed my signature in presence of two witnesses.

RALPH ASHLEY.

Witnesses:
ANNIE ASHLEY,
CORNELIUS GARRISON.